April 24, 1951    E. H. SARGENT ET AL    2,550,166
PLURAL WIRE BUTTER CUTTER
Filed July 19, 1946
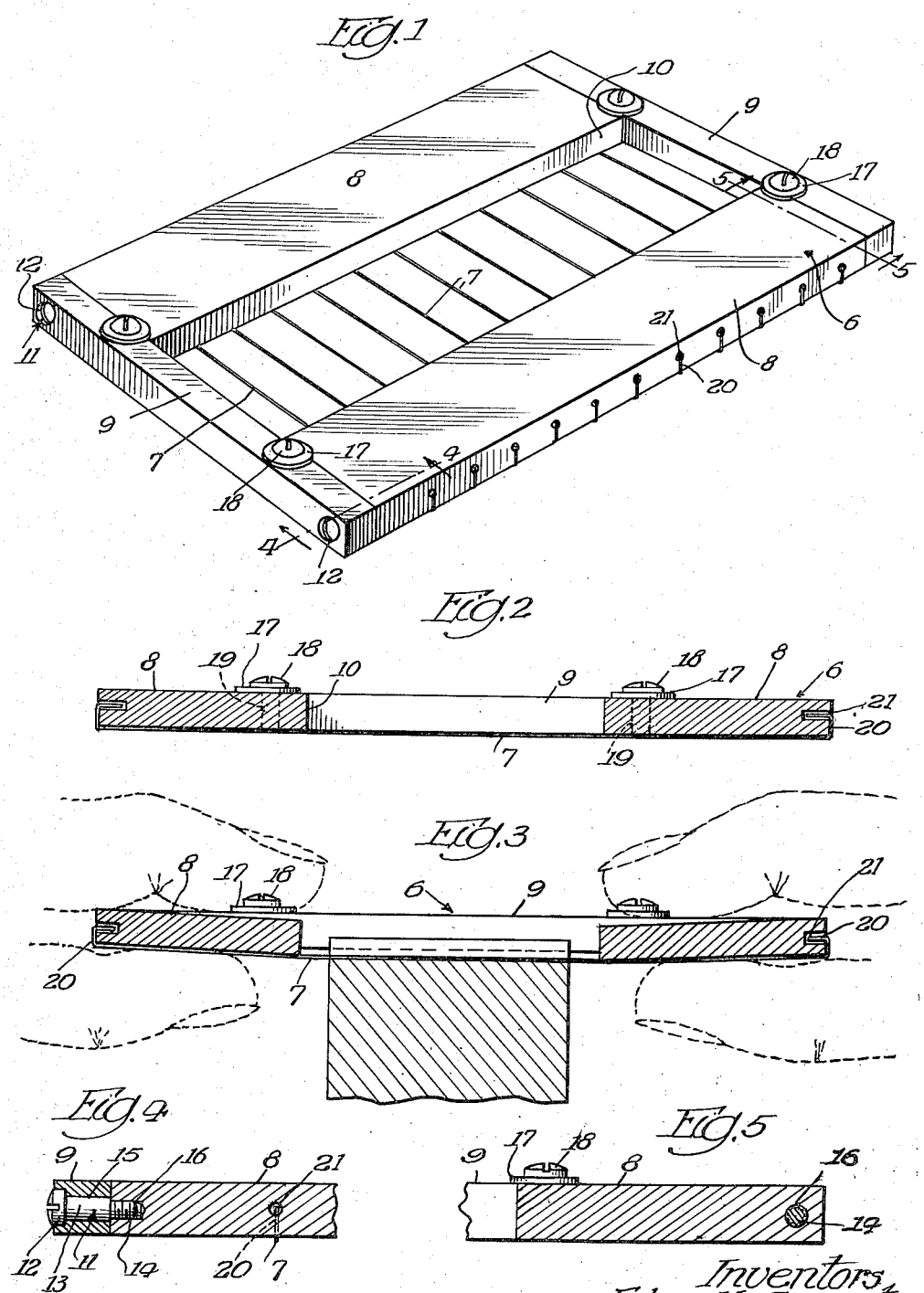

Patented Apr. 24, 1951

2,550,166

UNITED STATES PATENT OFFICE 2,550,166

PLURAL WIRE BUTTER CUTTER

Edgar H. Sargent, Cedar Rapids, and John B. Wadsworth, Council Bluffs, Iowa, assignors to The Sargent Company, Cedar Rapids, Iowa, a corporation of Iowa Application July 19, 1946, Serial No. 684,920

2 Claims. (Cl. 30—117)

The present invention relates generally to cutters. More particularly the invention relates to that type of cutter which is designed primarily to cut butter, oleomargarine, cheese and similar products into pats of uniform size and comprises a rectangular frame and a longitudinal series of equidistantly spaced wires that extend between, and have the ends thereof connected to, the side members of the frame and are adapted when the cutter is moved or shifted downwards after being positioned so that the product to be cut is in alignment with the interior of the frame to cut the product into the desired pats.

One object of the invention is to provide a cutter of this type which is an improvement upon, and has certain inherent advantages over, previously designed cutters for the same purpose and of the same general character and is characterized by the fact that the ends of the wires extend transversely across the bottom faces of the side members of the frame and hence the central or operative portions of the wires are disposed beneath the frame interior and permit the cutter completely to cut the product to be cut without the necessity of placing the product on a supporting block of less size than the frame interior.

Another object of the invention is to provide a cutter of the type and character under consideration in which the outer portions of the side members of the frame are so pivotally connected to the ends of the frame end members that when the cutter is shifted downwards in connection with a cutting operation and with pressure on the inner portions of the frame side members such members swing downwards and outwards to a limited extent and place the wires under such tension that they remain straight and hence uniformly and properly cut the product.

Another object of the invention is to provide a cutter of the last mentioned character wherein the frame is provided with simple stop means for preventing the side members of the frame from swinging upwards and outwards with respect to the frame end members.

A further object of the invention is to provide a cutter of the aforementioned type in which the wires are provided at the ends thereof with upwardly extending hooks which fit within horizontal holes leading inwards from the outer side edges of the frame side members and serve to connect or secure the wires to the frame side members.

A still further object of the invention is to provide a cutter which effectively and efficiently fulfills its intended purpose and is so constructed or designed that it may be readily cleaned and also manufactured at a low or reasonable cost.

Other objects of the invention and the various advantages and characteristics of the present cutter will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a cutter embodying the invention;

Figure 2 is an enlarged transverse section showing the side members of the frame in their normal position wherein they and the frame end members are coplanar and illustrating in detail the manner in which the hooks at the ends of the wires are hooked into the holes leading inwards from the outer side edges of the frame side members in order that they serve to secure the wires in place;

Figure 3 is a similar section showing in connection with use of the cutter the manner in which the frame side members are caused in response to downward pressure to swing downwards and outwards to such an extent as to place the wires under such tension as to hold the central or operative portions thereof straight;

Figure 4 is an enlarged longitudinal section taken on the line 4—4 of Figure 1 and illustrating in detail the construction and design of one of the pivotal connections between the outer portions of the side members of the frame and the ends of the frame end members; and Figure 5 is an enlarged transverse section taken on the line 5—5 of Figure 1 and showing in detail the construction and design of the stop means for limiting upward swinging movement of the side members of the frame with respect to the frame end members.

The cutter which is shown in the drawing constitutes the preferred form or embodiment of the invention. It is primarily designed or adapted to cut butter, oleomargarine, cheese or any like, comparatively soft, plastic product into pats of uniform size and as its principal components or parts comprises a rectangular frame 6 and a longitudinal series of transversely extending spaced apart wires 7.

The frame 6 consists of a pair of parallel laterally spaced side members 8 and a pair of end members 9. The side members are in the form of flat strips of aluminum or any other suitable material and define with the central portions of the frame end members 9 a central space 10 within the frame. This space is preferably slightly longer and slightly wider than the product to be cut into pats of uniform size. It is contemplated that the product will be in the form of a brick or so-called rectangular stick and also that when the cutter is used the product will be placed on any flat supporting surface and the frame will thereafter be positioned above the product and so that the latter is in alignment with the central space 10 within the frame. After so positioning the frame the cutter is shifted rectilinearly downwards in order that the central portions of the wires 7 will effect, as hereinafter described more in detail, the desired cutting of the product. As best shown in Figure 1 of the drawing the ends of the frame end members 9 are positioned against the end edges of the side members 8. The outer portions of the frame side members 8 are pivotally connected by way of pivot screws 11 to the ends of the frame end members 9 in order that the side members are permitted to swing downwards and outwards with respect to the end members. When the cutter is used it is contemplated that the central inner portions of the frame side members will be gripped between the user's thumbs and first fingers. As the cutter is shifted downwards the user's right hand will be turned in a counterclockwise direction and the left hand will be turned in a clockwise direction, thus exerting such pressure on the central inner portions of the frame side members that such members will be urged to swing downwards and outwards with respect to the end members of the frame. When the frame side members are swung in such manner the central or operative portions of the wires 7 will be subjected, as hereinafter described, to such tension as to render them straight or taut for product cutting purposes. The pivot screws 11 (see Figure 4) comprise shanks and kerf equipped heads 12. The shanks of the pivot screws embody cylindrical inner end portions 13 and reduced externally threaded outer end portions 14. The cylindrical inner end portions 13 of the screw shanks extend through and fit rotatably in horizontal transversely extending bores 15 in the ends of the frame end members 9. The outer ends of the bores 15 are countersunk in order to accommodate the heads 12 of the pivot screws. The externally threaded outer end portions 14 fit within internally threaded sockets 16 in the outer corners of the frame side members 8. Upward and outward swinging of the side members with respect to the end members is prevented by means of washers 17. The latter are four in number, fit against the top faces of the frame end members 9 and are arranged so that portions thereof overlie the inner corners of the frame end members. They are secured in place by means of screws 18 which extend downwards through the washers into vertically extending internally threaded sockets 19 in the frame end members 9. The sockets 19 are located inwards of the bores 15.

The wires 7 constitute the cutting medium or instrumentality of the cutter and are spaced equidistantly apart. They extend transversely of the frame 6 as heretofore indicated and are arranged so that the central or operative portions thereof extend under and across the rectangular space 10 between the side and end members 8 and 9 and their end portions underlie and extend across the bottom faces of the frame side members as best shown in Figures 2, 3 and 4 of the drawing. The extremities of the wires are bent upwards and then inwards to form upwardly extending hooks 20. The upwardly extending portions of the hooks bear against the outer side edges of the frame side members 8 and the inwardly extending portions of the hooks fit within horizontal holes 21 which are formed in the outer side portions of the frame members 8 and lead inwards from the outer side edges of said side members 8. The hooks 20, because they are in hooked or interlocked relation with the holes 21, serve to connect or anchor the ends of the wires 7 to the outer side portions of the frame side members 8. In assembling the cutter one of the frame side members 8 is first connected to the adjacent ends of the end members 9 by way of two of the pivot screws 11. Thereafter the wires 7 are properly positioned under the one side member and the hooks 20 on the ends of the wires that are adjacent the one side member are hooked in place. After such operation the other side member of the frame is placed over the other ends of the wires and is then shifted outwards in order to bring the hooks at said other ends of the wires into their respective holes 21. After such shift on the part of the other frame side member the pivot screws for the latter are secured in place. When the frame is in its fully assembled position the hooks 20, as previously pointed out, serve firmly to anchor the wires 7 to the outer side portions of the frame side members. It is contemplated that when the frame is assembled the central portions of the wires 7 will be taut. Should any looseness develop or occur in the wires due to stretching or expansion such looseness is automatically taken up when the frame side members are urged downwards and outwards in connection with use of the cutter. In connection with use of the cutter, as shown in Figure 3, the central or operative portions of the wires are placed under such tension that they remain straight and hence uniformly and properly cut the product. Because of the fact that the wires are normally under tension the frame side members are automatically swung upwards against the washers 17 immediately after release of the frame following a product cutting operation. By reason of the fact that the wires 7 extend transversely across the bottom faces of the frame side members 8 the central or operative portions of the wires are disposed beneath the frame interior, i. e., the rectangular space 10 and permit the cutter completely to cut the product to be cut without the necessity of placing the product on a supporting block of less size than the frame interior.

The herein described cutter is essentially simple in design and construction and hence may be produced at a comparatively low cost. It effectively and efficiently fulfils its intended purpose by reason of the fact that the central or operative portions of the wires are disposed beneath the space 10 and the frame side members 8, due to the fact that the outer portions thereof are pivotally connected to the ends of the end members 9, serve automatically to place the central portions of the wires under tension when the cutter is used.

The invention is not to be understood as restricted to the details set forth since these may be modified within the scope of the appended claims without departing from the spirit and scope of the invention.

Having thus described the invention what we claim as new and desire to secure by Letters Patent is:

1. As a new article of manufacture, a cutter adapted to cut butter and like products into pats and comprising a rectangular frame adapted in connection with a cutting operation to be held substantially horizontally and then shifted downwards and consisting of a pair of elongated parallel laterally spaced side members having longitudinally extending sockets in their outer corners and a pair of end members having the ends thereof disposed adjacent the ends of the side members and provided with transverse bores in alignment with the sockets, pivotal elements extending through the bores and into the sockets and serving to support said side members so that they are permitted to swing relatively to the end members, and a longitudinal series of spaced apart wires having the central portions thereof extending transversely across the space between the side members of the frame and their end portions underlying and fitting flatly against the bottom faces of the side members and anchored to said side members, and adapted in response to downward swinging of said side members relatively to the end members to have their central portions placed under tension.

2. As a new article of manufacture, a cutter adapted to cut butter and like products into pats and comprising a rectangular frame adapted in connection with a cutting operation to be held substantially horizontally and then shifted downwards and consisting of a pair of parallel laterally spaced side members having longitudinally extending sockets in their outer corners and a pair of end members having the ends thereof disposed adjacent the ends of the side members and provided with transverse bores in alignment with the sockets, pivotal elements extending through the bores and into the sockets and serving to support said side members so that they are permitted to swing relatively to the end members, stop means mounted on the central portions of the frame end members and arranged so that they overlie the inner corners of the side members and coact therewith to prevent the side members from swinging upwards past said central portions of the end members, and a longitudinal series of spaced apart wires having the central portions thereof positioned beneath and extending transversely of the space between the side members of the frame and their end portions underlying and fitting flatly against the bottom faces of the side members and anchored to the outer side margins of said side members, and adapted in response to downward swinging of the frame side members relatively to the end members to have their said central portions rendered taut.

EDGAR H. SARGENT.
JOHN. B. WADSWORTH.

REFERENCES CITED

The following references are of record in the file of this patent:

UNITED STATES PATENTS

| Number | Name | Date |
| --- | --- | --- |
| 1,027,020 | Waters | May 21, 1912 |
| 1,714,495 | Case | May 28, 1929 |